(12) United States Patent
Johansson et al.

(10) Patent No.: US 6,702,943 B1
(45) Date of Patent: Mar. 9, 2004

(54) METHOD FOR ANION-EXCHANGE ADSORPTION AND ANION-EXCHANGERS

(75) Inventors: Bo-Lennart Johansson, Uppsala (SE); Mikael Andersson, Uppsala (SE); Jan Gustavsson, Uppsala (SE); Makonnen Belew, Uppsala (SE); Jean-Luc Maloisel, Enebyberg (SE)

(73) Assignee: Amersham Biosciences AB, Uppsala (SE)

( * ) Notice: Subject to any disclaimer, the term of this patent is extended or adjusted under 35 U.S.C. 154(b) by 0 days.

(21) Appl. No.: 10/130,958
(22) PCT Filed: Nov. 22, 2000
(86) PCT No.: PCT/EP00/11605
§ 371 (c)(1), (2), (4) Date: Sep. 16, 2002
(87) PCT Pub. No.: WO01/38227
PCT Pub. Date: May 31, 2001

(30) Foreign Application Priority Data

Nov. 22, 1999 (SE) .............................................. 9904197

(51) Int. Cl.$^7$ .............................................. B01D 15/08
(52) U.S. Cl. .................... 210/635; 210/656; 210/198.2; 210/502.1; 210/679; 530/413; 530/416
(58) Field of Search ................. 210/635, 656, 210/198.2, 502.1, 638, 660, 679; 530/413, 416, 417

(56) References Cited

U.S. PATENT DOCUMENTS

| | | | |
|---|---|---|---|
| 3,234,199 A | 2/1966 | Reid | 260/112 |
| 4,100,149 A * | 7/1978 | Meiller et al. | 530/416 |
| 4,229,342 A | 10/1980 | Mirabel | 260/120 |
| 4,431,528 A | 2/1984 | Schleppinghoff | 208/255 |
| 5,238,663 A | 8/1993 | Vikari | 423/139 |
| 6,090,288 A * | 7/2000 | Berglund | 210/635 |

FOREIGN PATENT DOCUMENTS

| | | | |
|---|---|---|---|
| EP | 0 448 831 A | 10/1991 | ................. 210/656 |
| FR | 2 321 932 A | 3/1977 | ................. 210/656 |
| GB | 2 050 192 A | 1/1981 | ................. 210/656 |
| WO | WO 97/29825 A | 8/1997 | ................. 210/656 |
| WO | WO 99/65607 A | 12/1999 | ................. 210/656 |

OTHER PUBLICATIONS

DE 34 11 420 A Oct. 10, 1985 Germany.
GB 1 563 990 A Apr. 2, 1980 Great Britain.
Patent Abstracts of Japan vol. 014, No. 232 (C–0719), May 17, 1990 & JP 02 056253 A Feb. 26, 1990 abstract.

* cited by examiner

Primary Examiner—Ernest G. Therkorn
(74) Attorney, Agent, or Firm—Royal N. Ronning, Jr.; Stephen G. Ryan; Yonggang Ji

(57) ABSTRACT

A method for the removal of a substance carrying a negative charge and being present in an aqueous liquid (I). The method comprises the steps of: (i) contacting the liquid with a matrix carrying a plurality of ligands comprising a positively charged structure and a hydrophobic structure, and (ii) desorbing the substance. The characterizing feature is that (I) each of said ligands together with a spacer has the formula: —SP—[Ar—R$_1$—N$^+$(R$_2$R$_3$R$_4$)] where (A) [Ar—R$_1$—N$^+$(R$_2$R$_3$R$_4$)] represents a ligand a) Ar is an aromatic ring, b) R$_1$ is $[(L)_n R'_1]_m$ where n and m are integers selected amongst zero or 1; L is amino nitrogen, ether oxygen or thioether sulphur; R'$_1$ is a linker selected among 1) hydrocarbon groups; 2) —C(=NH)—; c) R$_{2-4}$ are selected among hydrogen and alkyls; (B) SP is a spacer providing a carbon or a heteroatom directly attached to Ar—R$_1$—N$^+$(R$_2$R$_3$R$_4$); (C)—represents that SP replaces a hydrogen in (Ar—R$_1$—N$^+$(R$_2$R$_3$R$_4$); (D)—represents binding to the matrix; and (II) desorption. There is also described (a) anion-exchangers having high breakthrough capacities, (b) a screening method and (c) a desalting protocol.

16 Claims, No Drawings

Crowther et al (J. Chrom. 282 (1983) 619–628); Crowther et al (Chromatographia 16 (1982) 349–353); Wongyai (Chromatographia 38(718) (1994) 485–490); Bischoff et al (J. Chrom. 270 (1983) 117–126) have described high pressure liquid chromatography of olignucleoddes and small molecules on reverse phases carrying anion-exchanger ligands in which there is an aromatic component.

See also Sasaki et al (J. Biochem. 86 (1979) 1537–1548) in which a similar effect from an anion-exchanger based on a hydrophobic matrix is discussed.

METHOD FOR ANION-EXCHANGE ADSORPTION AND ANION-EXCHANGERS

REFERENCE TO RELATED APPLICATIONS

This application is a 371 of PCT/EP00/11605 filed Nov. 22, 2000.

FIELD OF INVENTION

The present invention relates a method for the removal of a compound (=substance) carrying a negative charge from an aqueous liquid (I). The method comprises the steps of i) contacting the liquid with an anion-exchanger that comprises a base matrix carrying a plurality of mixed mode anion-exchange ligands comprising (a) a positively charged structure and (b) a hydrophobic structure under conditions permitting binding between the ligands and the substance, and ii) desorbing said substance from said matrix by the use of a liquid (II).

The invention also relates to novel anion-exchangers in which there are anion-exchange ligands comprising both a hydrophobic structure and a positively charged structure.

The terms "carrying a negative charge" and "negatively charged" mean that the substance carries one or more negative charges and/or has a negative net charge.

The terms "mixed mode anion-exchanger ligand" and "bimodal anion-exchanger ligand", in the context of this invention, refer to a ligand that is capable of providing at least two different, but co-operative, sites which interact with the substance to be bound. One of these sites gives an attractive type of charge-charge interaction between the ligand and the substance of interest. The second site typically gives electron acceptor-donor interaction and/or hydrophobic interactions. Electron donor-acceptor interactions include interactions such as hydrogen-bonding, π—π, charge transfer, dipole-dipole, induced dipole etc.

BACKGROUND TECHNOLOGY

The method defined above is employed in chromatographic procedures utilizing monolithic matrices or particle matrices in form of packed or fluidised beds, and also in batch-wise procedures. The purpose of the procedures may be to purify a substance carrying a negative charge, in which case the substance is bound to the matrix, and, if necessary, further purified subsequent to desorption from the matrix. Another purpose is to remove an undesired substance that carries a negative charge from a liquid. In this latter case, the liquid may be further processed after having been contacted with the matrix in step (i). In both cases and if so desired, the matrix may be reused after desorption of the bound substance.

Other uses are assay procedures involving determination of either the substance carrying the negative charge or of a substance remaining in liquid I.

In previous anion-exchange adsorptions, the positively charged ligands typically have comprised nitrogen structures, such as primary, secondary, tertiary or quaternary ammonium structures. In some instances the ligands had a dual or bimodal functionality by comprising both a charged structure and a hydrophobic structure which has required modifications of the desorption protocols.

Simmonds et al (Biochem. J. 157 (1976) 153–159); Burton et al (J. Chromatog. A 814 (1998) 71–81); and Yon et al (Biochem. J. 151 (1975) 281–290) have described anion-exchanger ligands that comprise saturated hydrocarbon groups.

Serine proteases have been affinity adsorbed/desorbed to/from matrices to which p-minobenzamidine has been covalently linked via the para amino group. See Chang et al (J. Chem. Tech. Biotechnol. 59 (1994) 133–139) who used an adsorption buffer in which the pH is higher and the salt concentration is lower than in the desorption buffer;

Lee et al (J. Chromatog. A 704 (1995) 307–314) who changed the pHs in the same manner as Chang et al but without change in salt concentration; and Khamlichi et al., J. Chromatog. 510 (1990) 123–132 who used ligand analogues for desorption. The pH-values during adsorption and desorption were the same. Desorption by only increasing the Ionic strength failed.

None of the methodologies in these three articles describe successful desorption processes under anion-exchange conditions.

WO 9729825 (Amersham Pharmacia Biotech AB) discloses mixed mode anion-exchangers providing interactions based on charges and hydrogen-bonding involving oxygen and amino nitrogen on 2–3 carbons' distance from positively charged amine nitrogen. The publication is based on the discovery that this kind of ligands can give anion-exchangers that require relatively high ionic strengths for eluting bound substances.

WO 9965607 (Amersham Pharmacia Biotech AB) discloses cation-exchangers in which there are mixed mode ligands that require relatively high ionic strengths for eluting bound substances.

WO 9729825 (U.S. Pat. No. 6,090,288) and WO 9965607, which give anion and cation exchange ligands, respectively, that require relatively high elution ionic strength are incorporated by reference.

WO 9808603 (Upfront Chromatography) discloses separation media of the general structure MSP1-L where M is a support matrix that may be hydrophilic, SP1 is a spacer and L comprises a mono- or bicylic homoaromatic or heteroaromatic moiety that may be substituted (a homoaromatic moiety comprises an aromatic ring formed only by carbon atoms). The substituents are primarily acidic. The separation medium is suggested for the adsorption of proteins, in particular immunoglobulins, by hydrophobic interactions rather than ion-exchange (salt concentration up to 2 M).

WO 9600735, WO 9609116 and U.S. Pat. No. 5,652,348 (Burton et al) disclose separation media based on hydrophobic interaction. Adsorption and desorption are supported by increasing or decreasing, respectively, the salt concentration of the liquid or changing the charge on the ligand and/or th substance to be adsorbed/desorbed by changing pH. The ligands typically comprise a hydrophobic part that may comprise aromatic structure. Some of the ligands may in addition also contain a chargeable structure for permitting alteration of the hydrophobic/hydrophilic balance of the media by a pH change. The chargeable structure may be an amine group.

U.S. Pat. No. 5,789,578 (Burton et al) suggests to immobilise a thiol containing ligand, such as 3-mercaptopropionic acid, glutathione etc. by addition of the thiol group over carbon-carbon double bond attached to a support matrix. The inventors in this case neither employ nor suggest the use of the material obtained for anion-exchange adsorptions.

Dipolar adsorbents prepared by coupling sulphanilic acid using epichlorohydrin has been described (ligand+ spacer=—$CH_2CHOHCH_2N^+H_2C_5H_4SO_3$) (Porat et al., J. Chromatog. 51 (1970) 479–489; and Ohkubo et al., J. Chromatog. A, 779 (1997), 113–122). The articles do not disclose a separation method in which the ligand is positively, and the substance to be removed negatively, charged.

WPI Abstract Accession No. 86-312313 (=DNA-237844, Behrend et al) describes the use of 2,4,6-trihalo-1,3,5-triazine for binding substances RHNR'X to carriers inter alla to cellulose. R is hydrogen, aryl or alkyl; R' alkylene or arylene. X is carboxy, sulphonyl, phosphate, phosphonate, boronate, etc.

The Objectives of the Invention

The objectives of the present invention are:

a) to achieve adsorption/binding of negatively charged substances, such as proteins, to anion-exchangers at relatively high ionic strengths;

b) to provide anion-exchange media that can have a reduced ligand content while retaining a sufficient capacity to bind target substances;

c) to enable elution/desorption within broad ionic strength intervals of substances adsorbed/bound to an anion-exchangerr, d) to design anion-exchangers which have high break-through capacities, good recovery of proteins (often 95% or higher) etc:

e) to design anion-exchangers that can resist regeneration and/or cleaning with alkaline and or acidic milieu without significant loss of chromatographic properties;

f) to obviate extensive dilutions of samples of high ionic strength that are to be used in processes requiring a lowered ionic strength;

g) to provide simplified desalting procedures;

h) to provide a method for selecting anion-exchangers or anion-exchange ligands that, when bound to a support matrix, are equal or better than a conventional reference anion-exchanger in adsorbing a negatively charged substance;

i) to provide simplified processes involving anion-exchangers, for instance to improve productivity and/or reduce the costs for process equipment and investments;

j) to provide anion-exchangerrs that are adapted to preparative applications, for instance in large scale processes in which a sample volume (=liquid (I)) larger than a liter are applied and processed on an anion-exchangerr;

k) to provide opportunities for novel combinations of separation principles based elution of anion-exchanger adsorbents at high salt concentration, for instance hydrophobic interaction adsorption after an ion exchange step.

These objectives are based on the recognition that ion exchangers adsorbing at high salt concentrations and high ionic strengths have benefits. This is contrary to traditional ion exchangers which have utilized high salt concentrations and high ionic strengths in the desorption step.

The Invention

The present inventors have discovered that ligands containing an aromatic ring in the proximity of the positively charged atom may provide anion-exchangers that at least partially meet these objectives. The present inventors have also discovered that inclusion of other atoms or groups participating in electron-donor acceptor interactions in the proximity of the positively charged atom in anion-exchange ligands may enhance the strength of the interaction between the substance and the adsorbent.

By proximity in this context is meant that the distance between this kind of atoms or groups and the positively charged atom is 1–7 atoms, with preference for 2, 3, 4 and 5 atoms.

Electron donor-acceptor interactions mean that an electronegative atom with a free pair of electrons acts as a donor and bind to an electron-deficient atom that acts as an acceptor for the electron pair of the donor. See Karger et al., An Introduction into Separation Science, John Wiley & Sons (1973) page 42. Illustrative examples of donor atoms/groups are:

(a) oxygen with a free pair of electrons, such as in hydroxy, ethers, carbonyls, and esters (—O— and —CO—O—) and amides, (b) sulphur with a free electron pair, such as in thioethers (—S—).

(c) nitrogen with a free pair of electron, such as in amines, amides including sulphone amides], cyano, (d) halo (fluorine, chlorine, bromine and iodine), and (e) sp- and $sp^2$-hybridised carbons.

Typical acceptor atoms/groups are electron deficient atoms or groups, such as metal ions, cyano, nitrogen in nitro etc, and include a hydrogen bound to an electronegative atom such as HO— in hydroxy and carboxy —NH— in amides and amines, HS— in thiol etc.

The first aspect of the invention is thus a method for the removal of a substance that carries a negative charge and is present in an aqueous liquid (I). The method comprises step (i) and step (ii) as defined above. The main characterizing features are that the ligands with a spacer have the formula:

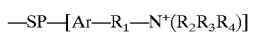

desorption in step (ii) is performed under anion-exchange conditions when $R_1$ is —C(=NH)— and the substance is a serine protease. For desorption of other substances see under the heading "Desorption" below.

Anion-exchange ligands as contemplated in the context of the present invention typically have molecular weights <1000, such as <700 daltons excluding the molecular weight contribution of halogens that may be present.

The Anion-exchanger

In the formula —SP—[Ar—$R_1$—$N^+(R_2R_3R_4)$]:

[Ar—$R_1$—$N^+(R_2R_3R_4)$] represents a ligand structure

SP is a spacer that attaches the ligand [Ar—$R_1$—$N^+(R_2R_3R_4)$] to the base matrix.

represents that the spacer replaces a hydrogen in [Ar—$R_1$—$N^+(R_2R_3R_4)$].

represents a link to the base matrix.

Henceforth the terms lower hydrocarbon group and lower alkyl (including lower alkylene) mean $C_{1-10}$, such as $C_{1-6}$, saturated hydrocarbon groups that optionally are substituted and have carbon chains as discussed below for $R_{2-4}$. See below.

The preferred positively charged structure —$N^+(R_2R_3R_4)$ in the ligand has a pKa value that is below 12.0, such as below 10.5. This typically means that the ligand is a primary or secondary ammonium group. For measurement of pKa see under the heading "Adsorption" below.

In the ligand $[Ar—R_1—N^+(R_2R_3R_4)]$:

a) Ar is an aromatic ring structure, b) $R_1$ is $[(L)_n R'_1]_m$ where n and m are integers selected amongst 0 or 1, with preference for (a) m=0 or (b) n=0 when m=1;

L is an amino nitrogen, an ether oxygen or a thioether sulphur;

$R'_1$ is a bivalent linker group selected among 1) linear, branched or cyclic hydrocarbon groups;

2) —C(=NH)—;

c) $R_2$, $R_3$, and $R_4$ are selected among hydrogen and lower alkyls.

The positive charge on the nitrogen may be more or less delocalised to atoms or groups in $Ar—R_1$ and/or $R_{2-4}$. For $R'_1$ equals —C(=NH)— (m—1), one, two or three of $R_{2-4}$ are preferably hydrogen.

The Group Ar

The aromatic ring structure Ar may comprise one or more aromatic rings, for instance a phenyl, a biphenyl or a naphthyl structure and other aromatic ring systems that comprise fused rings or bicyclic structures. Aromatic rings may be heterocyclic, i.e. contain one or more nitrogen, oxygen or sulphur atoms. The ring may have further substituents in addition to $R_1$ and a possible spacer. These other substituents may contain an electron donor or acceptor atom or group, for instance enabling hydrogen-bonding.

Illustrative Ar-groups are: hydoxyphenyl (2-, 3- and 4-), 2-benzimadozolyl, methylthioxyphenyl (2-, 3- and 4-), 3-indolyl, 2-hydroxy-5-nitrophenyl, aminophenyl (2-, 3- and 4-), 4-(2-aminoethyl)phenyl, 3,4-dihydroxyphenyl, 4-nitrophenyl, 3-trifluoromethylphenyl, 4-imidazolyl, 4-aminopyridine, 6-aminopyrimidyl, 2-thienyl, 2,4,5-triaminophenyl, 4-aminotriazinyl- 4-sulphoneamidophenyl etc.

The Group $R'_1$

For m=1, $R'_1$ is a bivalent hydrocarbon group or —C(=NH)—. In preferred bivalent hydrocarbon groups there are typically one or more atoms or groups participating in hydrogen-bonding or other electron acceptor-donor interactions as defined above. Thus $R'_1$ in form of a hydrocarbon group may be substituted with a) one or more primary ammonium groups (—$N^+H_3$) in which one or more of the hydrogens may be replaced with lower alkyl, and/or b) one or more hydroxy (—OH) in which the hydrogen may be replaced with a lower alkyl, and/or the carbon chain in the hydrocarbon group may be interrupted at one or more positions by thioether sulphur, ether oxygen or amine nitrogen The preferred hydrocarbon chains between Ar and —$N^+(R_2R_3R_4)$ have a length of 1–20 atoms (in $R'_1$).

Typical $R'_1$s are selected amongst —$CH_2$—, —$CH_2CH_2$—, —$CH_2CH_2CH_2$—, —$CH_2CH(CH_3)$—, —$CH_2OCH_2$—, —C(=O)—, —C(=NH)—, —$CH_2N^+$($C_2H_5)_2CH_2CH_2$—, —$CH_2CH_2(OCH_2CH_2$—$)_n'$ (where n' is an integer larger than 1, such as $\leq 100$ for instance $\leq 25$ or $\leq 10$) etc. For cases in which n=m=1, $R'_1$ is preferably a bivalent hydrocarbon group, such as (a) —$CH_2$—, (b) —$CH_2CH_2$— possibly substituted with a hydroxy and/or a hydroxy lower alkyl or lower alkyl (for instance hydroxy methyl or methyl, respectively) at one or two of its carbon atoms, (c) —$CH_2)_n"SCH_2)_n'"$ (where n" and n'" independently are integers 1–3, such as 1 and 2, respectively), and (d) —$CH_2N^+(C_2H_5)_2CH_2CH_2$—, (e) —$CH_2CH_2(OCH_2CH_2$—$)_n'$ (where n' is 1, 2 or 3).

The Group $R_{2-4}$

In a preferred case two or three of $R_{2-4}$ are hydrogen if the spacer is attached to $R'_1$ or Ar, and three if the spacer is attached to the nitrogen. Thus, the anion-exchanger ligands are preferably primary or secondary amine/ammonium groups $R_{2-4}$ alkyl groups may contain hydrogen-bonding atoms as defined above. Thus, a hydrogen in $R_{2-4}$ may be replaced at one or more positions with —$OR"_1$, and/or —$N^+(R'_2R'_3R'_4)$, in which $R'_{2-4}$ and $R"_1$ are hydrogen or lower alkyl. In addition, a carbon chain in $R_{2-4}$ may be interrupted at one or more positions with ether oxygen, thioether sulphur or amino nitrogen.

One or more of $R_{2-4}$ may be a bivalent alkylene forming a 5- or 6-membered ring by having one end attached to the nitrogen and the other replacing a hydrogen in $R_1$ or one of the remaining $R_2$, $R_3$, and $R_4$.

If not hydrogen, one or more of $R_{2-4}$, $R'_{2-4}$ and $R"_1$ groups are often selected amongst lower alkyl groups having 1–3 carbon atoms.

In variants of $R_{2-4}$, $R'_{1-4}$ and $R"_1$, each $sp^3$-hybridised carbon carries at most one atom selected from amino nitrogen, thioether sulphur, and ether and hydroxy oxygens.

The Spacer (SP)

The spacer (SP) starts at the base matrix and extends (a) to the nitrogen in —$N^+(R_2R_3R_4)$ by replacing one of $R_{2-4}$, or (b) to the chain of atoms connecting —$N^+(R_2R_3R_4)$ with Ar by replacing a hydrogen in $R_1$, or (c) to an aromatic ring in Ar by replacing a hydrogen in Ar. SP always replaces a hydrogen in the ligand $[Ar—R_1—N^{30}(R_2R_3R_4)]$. It is thus presumed that if the spacer binds directly to the nitrogen or the sulphur atom in the ligand, then the replaced group $R_{2-5}$ has been hydrogen.

The spacer as such is conventional as in traditional ion exchangers and may thus comprise linear, branched, cyclic saturated, unsaturated and aromatic hydrocarbon groups (e.g. with up to 1–20, such as 1–10 carbon atoms). As discussed above for $R_{1-5}$, hydrocarbon groups may carry hydroxy groups, alkoxy and aryloxy and the corresponding thio analogues, and/or amino groups. Carbon chains may at one or more positions be interrupted by amino nitrogen, ether oxygen, thioether sulphur as discussed above for $R_{1-4}$. There may also be carbonyl groups, such as in amides and ketones, and other groups having the comparable stability against hydrolysis. At most one atom selected from oxygen, sulphur and nitrogen is preferably bound to one and the same $sp^3$-hybridised carbon atom.

SP may provide one or more electron donor or acceptor atoms or groups enhancing binding of the substance to the anion-exchanger as discussed above, for instance by participating in hydrogen-bonding. These atoms or groups may (a) be part of or attached directly to the chain of atoms in the spacer extending from the base matrix to the ligand or (b) be part of a branch group attached to this chain. A branch group in this context is a group which is attached directly to the chain of atoms referred to in the preceding paragraph, and comprises an atom or group participating in electron-donor acceptor interaction, such as hydrogen-bonding.

In a preferred variant, the part of SP binding directly to Ar—$R_1$—$N^+(R_2R_3R_4)$ is:
- a carbon with preference for a carbonyl carbon or an $sp^3$-hybridised carbon, or
- a nitrogen with preference for an amino or amino nitrogen; or
- a sulphur with preference for a thioether sulphur; or
- an oxygen, with preference for an ether oxygen;

with the proviso that SP is attached to a carbon in [Ar—$R_1$—$N^+(R_2R_3R_4)$] for (b)–(d).

Typical structures in SP that are attached directly to [Ar—$R_1$—$N^+(R_2R_3R_4)$] are: —$CH_2$—, —$CH_2CH_2$—, —$CH_2CH_2CH_2$—, —$CH_2CH(CH_3)$—, —$C(CH_3)_2$—, —$C(CH_2CH_3)_2$—, —$C(OCH_3)_2$—, —$CH_2OCH_2$—, —$CH_2SCH_2$—, —$CH_2NHCH_2$—, —$CH_2O$—, —$CH_2CH_2O$—, —$CH_2S$—, —$CH_2CH_2S$—, —$CH_2NH$—, $CONH$—, —$NHCO$—, —$CONH(CH_2)_2SCH_2$—, —$NHCH_2CH_2CH_2CH_2CH_2CONH$—, —$CH_2CH_2NH$—, —$CH_2CH(OH)CH_2OCH_2CH(OH)CH_2O$—, (the right valence binds to Ar—$R_1$—$N^+(R_2R_3R_4)$). The remaining part of the spacer may be of the same kind as in traditional ion-exchangers.

The spacer may be introduced according to conventional covalent coupling methodologies including also techniques to be developed in the future. Illustrative coupling chemistries involve epichlorohydrin, epibromohydrin, allylglycidylether, bisepoxides such as butanedioldiglycidylether, halogen-substituted aliphatic substances such as di-chloro-propanol, divinyl sulfone, carbonyldiimidazole, aldehydes such as glutaric dialdehyde, quinones, cyanogen bromide, periodates such as sodium-meta periodate, carbodiimides, chloro-triazines, sulfonyl chlorides such as tosyl chlorides and tresyl chlorides, N-hydroxy succinimides, oxazolones, maleimides, 2-fluoro-1-methylpyridinium toluene-4-sulfonates, pyridyl disulfides and hydrazides.

The Base Matrix

The base matrix is based on organic and/or inorganic material.

The base matrix is preferably hydrophilic and in the form of a polymer, which is insoluble and more or less swellable in water. Hydrophobic polymers that have been derivatized to become hydrophilic are included in this definition. Suitable polymers are polyhydroxy polymers, e.g. based on polysaccharides, such as agarose, dextran, cellulose, starch, pullulan, etc. and completely synthetic polymers, such as polyacrylic amide, polymethacrylic amide, poly(hydroxyalkylvinyl ethers), poly(hydroxyalkylacrylates) and polymethacrylates (e.g. polyglycidylmethacrylate), polyvinylalcohols and polymers based on styrenes and divinylbenzenes, and copolymers in which two or more of the monomers corresponding to the above-mentioned polymers are included. Polymers, which are soluble in water, may be derivatized to become insoluble, e.g. by cross-linking and by coupling to an insoluble body via adsorption or covalent binding. Hydrophilic groups can be introduced on hydrophobic polymers (e.g. on copolymers of monovinyl and divinylbenzenes) by polymerization of monomers exhibiting groups which can be converted to OH, or by hydrophilization of the final polymer, e.g. by adsorption of suitable compounds, such as hydrophilic polymers.

Suitable inorganic materials to be used in base matrices are silica, zirconium oxide, graphite, tantalum oxide etc.

Preferred matrices lack groups that are unstable against hyrolysis, such as silan, ester, amide groups and groups present in silica as such. This in particular applies with respect to groups that are in direct contact with the liquids used.

The matrix may be porous or non-porous. This means that the matrix may be fully or partially permeable (porous) or completely impermeable to the substance to be removed (non-porous), i.e. the matrix should have a Kav in the interval of 0.40–0.95 for substances to be removed. This does not exclude that Kav may be lower, for instance down to 0.10 or even lower for certain matrices, for instance having extenders. See for instance WO 9833572 (Amersham Pharmacia Biotech AB).

In a particularly interesting embodiment of the present invention, the matrix is in the form of irregular or spherical particles with sizes in the range of 1–1000 $\mu$m, preferably 5–50 $\mu$m for high performance applications and 50–300 $\mu$m for preparative purposes.

An interesting form of matrices has densities higher or lower than the liquid. This kind of matrices is especially applicable in large-scale operations for fluidised or expanded bed chromatography as well as for different batch wise procedures, e.g. in stirred tanks. Fluidised and expanded bed procedures are described in WO 9218237 (Amersham Pharmacia Biotech AB) and WO 9200799 (Kem-En-Tek).

The term hydrophilic matrix means that the accessible surface of the matrix is hydrophilic in the sense that aqueous liquids are able to penetrate the matrix. Typically the accessible surfaces on a hydrophilic bass matrix expose a plurality of polar groups for instance comprising oxygen and/or nitrogen atoms. Examples of such polar groups are hydroxyl, amino, carboxy, ester, ether of lower alkyls (such as (—$CH_2CH_2O$—)$_n$H where n is an integer).

The level of anion-exchange ligands in the anion-exchangers used in the invention is usually selected in the interval of 0.001–4 mmol/ml matrix, such as 0.002–0.5 mmol/ml matrix, with preference for 0.005–0.3 mmol/ml matrix. Possible and preferred ranges are among others determined by the kind of matrix, ligand, substance to be removed etc. Thus, the level of anion-exchange ligands is usually within the range of 0.01–0.3 with preference for 0.01–0.1 mmol/ml for agarose based matrices. For dextran based matrices the interval is typically 0.01–0.6 mmol/ml matrix with subrange being 0.01–0.2 mmol/ml matrix. In the certain variants, for instance when $R_1$ is —C(=NH)—, the level of the mixed mode ligand is often at the lower half part of these intervals. In these variants of the invention the levels of anion-exchange ligand thus are smaller than 0.150 mmol per ml matrix and/or smaller than 1 mmol per gram dry weight of matrix. The expression "mmol per ml matrix" refers to fully sedimented matrices saturated with water. The capacity range refers to the capacity of the matrix in fully protonated form to bind chloride ions. It includes a possible contribution also from positively charged groups other than the nitrogen in the ligand [Ar—$R_1$—$N^+(R_2R_3R_4)$], for instance in the spacer or in any of the groups $R_{2-4}$, $R'_{1-4}$ and $R''_1$.

Stability of the Novel Anion-exchangers

The inventive anion-exchangers/anion-exchanges ligands should resist the conditions typically applied in processes comprising anion-exchange absorptions. As a general rule, this means that an anion-exchanger according to the invention should be able to resist 0.1 or 1 M NaOH in water for at least 10 hours with essentially no reduction in total ion binding capacity. By "essentially no reduction in total ion binding capacity" is contemplated that the total ion binding capacity is reduced at most by 10%. In structural terms this means that the anion-exchange ligand in preferred variants should only contain structures selected among pure hydrocarbon groups (including homoaromatic and heteroaromatic structures), thioether and ether groups, disulphide groups, hydroxy groups, sulphoxide or sulphone groups, carboxamide groups, sulphone amide groups, acetal and ketal groups and groups of similar hydrolytic stability.

Selection of anion-exchanger to be used for removal of a particular substance. In the preferred variants of the inventive method the anion-exchanger is selected among anion-exchangers that adsorb the particular substance at relatively high ionic strengths. The anion-exchanger (1) used should thus be capable of:

(a) binding the substance of interest in an aqueous reference liquid (II) at an ionic strength corresponding to 0.25 M NaCl, and (b) permitting a maximal break through capacity somewhere in the pH interval 2–12 for the substance $\geq 200\%$, such as $\geq 300\%$ or $\geq 500\%$ or $\geq 1000\%$, of the break through capacity of the substance for a conventional anion-exchanger (2) (reference anion-exchanger).

Primarily these percentage figures apply to measurements made during anion-exchanger conditions. The reference liquid typically consists of a buffered aqueous liquid and the substance.

An indirect way of finding this kind of anion-exchangers is to screen for anion-exchangers that have an increased maximal elution ionic strength for the substance (carrying the negative charge) compared to the elution ion strength required for the same substance on a conventional anion-exchanger. Thus, the anion-exchanger may be selected among those requiring more than 125%, such as more than 140% or more than 200%, of the elution ionic strength required for a standard anion-exchanger at the particular conditions applied for a selected substance to be removed. See WO 9729825 (Amersham Pharmacia Biotech AB)

The comparisons above refer to measurements performed under essentially the same conditions for anion-exchangerr (1) and (2), i.e. essentially the same support matrix (support material, bead size, pore sizes, pore volume, packing procedure etc), pH, temperature, solvent composition, number of charged ligand having the formula given above etc. The breakthrough capacities are measured at the same relative concentration of the substance in the flow through (for instance $c/c_0=10\%$, for $c/c_0$ see the experimental part). The spacer and coupling chemistry may differ. Certain kinds of coupling chemistries may lead to cross-linking of the support matrix resulting in a more rigid matrix. In this case the flow conditions at which the comparison is made is selected at a level where the matrix is essentially non-compressed.

As a reference ion-exchanger, the commercially available anion-exchanger Q-Sepharose Fast Flow (Amersham Pharmacia Biotech. Uppsala, Sweden) was selected in the context of the present invention. This anion-exchanger is a strong anion-exchanger whose ligand and spacer arm structure are:

Its chloride ion capacity is 0.18–0.25 mmol/ml gel. The base matrix is epichlorohydrin cross-linked agarose in beaded form. The beads have diameters in the interval 45–165 μm. The exclusion limit for globular proteins is $4 \times 10^6$.

Best Mode

Based on experimental results achieved at the priority date the best ligand was considered to have n=0, m=1, $R'_1$—$N^+H_3$=—$C(=N^+H_2)NH_2$, and Ar=p—$C_6H_4$—. The formula —$C(=N^+H_2)NH_2$, is only a representation of a group in which the charge in reality is delocalised over the —N—C—N— grouping and a hydrogen is binding accordingly. SP was attached to Ar via the nitrogen atom of an amino group. See further the experimental part for information about the best mode for spacer and base matrix.

During the priority year the experimental support has been extended to a large number of various ligands. The best mode varies with substance of interest and is apparent from the experimental part in which the best ligands discovered so far are given.

Adsorption/Desorption

The adsorption and/or desorption steps may be carried out as a chromatographic procedure with the anion-exchange matrix in a monolithic form or as particles in the form of a packed or a fluidised bed. For particulate matrices, these steps may be carried out in a batch-wise mode with the particles being more or less completely dispersed in the liquid (e.g. in a fluidised/expanded bed).

The liquids used in steps (i) and (ii) are aqueous, i.e. water, possibly mixed with a water-miscible solvent.

Adsorption

During adsorption, a liquid sample containing the negatively charged substance is contacted with the anion-exchanger defined above under conditions permitting adsorption (binding), preferably by anion-exchange. In other words the substance is at least partially negative and the ligand at least partially positive.

By anion-exchanger is contemplated that the substance to be removed carries a negative charge and the anion-exchangerr is positively charged (=anion-exchanger conditions). For an amphoteric substance that is present in an aqueous liquid this means a $pH \geq pI-0.5$, preferably $pH \geq pI$.

In the preferred variants, weak anion-exchangers (preferably present as a primary or secondary amine group in the anion-exchangerr) are buffered to a pH within the interval$\leq pKa+2$, preferably$\leq pKa+1$. The lower limit can extend down to at least pH=1 or 2 and is primarily determined by the stability of the anion-exchanger in acidic milieu and by the isoelectric point (pI) and stability of the substance to be removed. The pka-value of an anion-exchanger is taken as the pH at which 50% of its titratable groups are neutralized.

The ionic strength (measured as salt concentration or conductivity) is typically below the elution ionic strength for the particular combination of ion-exchanger, substance to be bound, temperature and pH, solvent composition etc. One of the benefits of the invention is that by using the mixed mode anion-exchangers defined above, it will be possible to carry out adsorption/binding also at elevated ionic strengths compared to what normally has been done for conventional ion-exchangers (reference anion-exchangerrs). By matching the anion-exchanger with the substance to be removed, the adsorption may be carried out at an ionic strength that is higher than when using the reference ion-exchanger (measured at the same pH and otherwise the same conditions). Depending on the anion-exchanger used the ionic strength may be more than 25% higher such as more than 40% higher. Some combinations of anion-exchanger and substance to be removed may permit adsorption at more than 100% higher ionic strength than when using the corresponding reference ion-exchanger according to above.

In absolute figures the discussion in the preceding paragraph means that adsorption according to the present invention may be performed at ionic strengths above or below 15 or 20 mS/cm. The ionic strength may exceed 30 mS/cm and in some cases even exceed 40 mS/cm. Useful ionic strengths often correspond to NaCl concentrations (pure water) $\geq 0.1$ M. such as $\geq 0.3$ M or even $\geq 2$ 0.5 M. The conductivity/ionic strength to be used will depend on the ligand used, its density on the matrix, the substance to be bound, its concentration etc.

Depending on the anion-exchanger selected, breakthrough capacities $\geq 200\%$, such as $\geq 300\%$ or $\geq 500\%$ and even $\geq 1000\%$ of the breakthrough capacity obtained for a particular substance with the reference anion-exchanger may be accomplished (the same conditions as discussed before).

Desorption

Desorption may be carried out according to established protocols. Preferably the desorption process comprises at least one of the following procedures:

(A) Increasing the salt concentration (ionic strength), (B) Increasing pH in order to lower the positive charge on the ligands, (C) Decreasing pH for decreasing a negative charge or for reversing the charge on the substance bound to the matrix, (D) Adding a ligand analogue or an agent (e.g. a solvent) that reduces the polarity of the aqueous liquid (I).

According to the invention serine proteases are only desorbed under anion-exchange conditions if $R'_1$ is —C(=NH)—.

The conditions provided by (A)–(D) may be used in combination or alone. The proper choice will depend on the particular combination of (a) substance to be desorbed, (b) anion-exchanger (ligand, kind of matrix, spacer and ligand density), and (c) various variables of aqueous liquid II (composition, polarity, temperature, pH etc).

Replacing aqueous liquid I (adsorption buffer) with aqueous liquid II (desorption buffer), thus means that at least one variable such as temperature. pH, polarity, ionic strength, content of soluble ligand analogue etc shall be changed while maintaining the other conditions unchanged so that desorption can take place.

In the simplest cases this means:

(a) an increase in ionic strength and/or (b) a decrease in pH for reducing the negative charge of the substance to be desorbed, when changing from aqueous liquid I to aqueous liquid II. Alternative (a) includes a decreased, a constant or an increased pH. Alternative (b) includes a decreased, an increased or a constant ionic strength.

In chromatographic and/or batch procedures the matrix with the substance to be desorbed is present in a column or other suitable vessel in contact with the adsorption liquid (aqueous liquid I). The conditions provided by the liquid are then changed as described above until the desired substance is eluted from the matrix. After adsorption, a typical desorption process means that the ionic strength is increased compared to that used during adsorption and in many cases correspond to at least 0.4 M NaCl, such as at 0.6 M NaCl, if pH or any of the other variables except ionic strength are not changed. The actual values will depend on the various factors discussed above.

The requirement for using an increased ionic strength for desorption may be less strict depending on the conditions provided by aqueous liquid II. See below.

The change in conditions can be accomplished in one or more steps (step-wise gradient) or continuously (continuous gradient). The various variables of the liquid in contact with the matrix may be changed one by one or in combination.

Typical salts to be used for changing the ionic strength are selected among chlorides, phosphates, sulphates etc of alkali metals or ammonium ions).

Typical buffer components to be used for changing pH are preferably selected amongst acid-base pairs in which the buffering component can not bind to the ligand, i.e. piperazine, 1,3-diaminopropane, ethanolamine etc. A decrease in pH in step (ii) will reduce the negative charge of the substance to be desorbed, assist desorption and thus also reduce the ionic strength needed for release from the matrix. Depending on the pKa of the ligand used and the pI of the substance to be released, an increase in pH may result in the release of the substance or increase its binding to the ion-exchange matrix.

Desorption may also be assisted by adjusting the polarity of liquid (II) to a value lower than the polarity of the adsorption liquid (I). This may be accomplished by including a water-miscible and/or less hydrophilic organic solvent in liquid II. Examples of such solvents are acetone, methanol, ethanol, propanols, butanols, dimethyl sulfoxdde, dimethyl formamide, acrylonitrile etc. A decrease in polarity of aqueous liquid II (compared to aqueous liquid I) is likely to assist in desorption and thus also reduce the ionic strength needed for release of the substance from the matrix.

Desorption may also be assisted by including a soluble structural analogue of the ligand $[Ar—R_1—N^+(R_2R_3R_4)]$. Its concentration in liquid (II) should be larger than its concentration in aqueous liquid (I). A "structural analogue of the ligand" or "ligand analogue" is a substance that has a structural similarity with the ligand and in soluble form inhibits binding between the ligand attached to the matrix and the substance to be removed.

Recovery

In a sub-aspect the present inventive method enables high recoveries of an adsorbed substance, for instance recoveries above 60% such as above 80% or above 90%. Recovery is the amount of the desorbed substance compared to the amount of the substance applied to an anion-exchanger in the adsorption/binding step. In many instances, the recovery can exceed even 95% or be essentially quantitative. Typically the amount of the substance applied to an anion-exchanger is in the interval of 10–80%, such as 20–60%, of the total binding capacity of the anion-exchanger for the substance.

The substance to be removed from the liquid (I).

Removal of a substance according to the invention is primarily carried out in order to purify the substance or some other substance that is present in liquid (I).

The present invention is primarily intended for large molecular weight substances that have several structural units that can interact with mixed mode ligands defined above. Appropriate substances typically have a molecular weight that Is above 1000 dalton and/or are bio-organic and/or polymeric. The number of net negatively charged groups per molecule is typically one or more. Preferably the charge of the substances is dependent on pH (i.e. the substance is amphoteric). Among biomolecules those having polypeptide structure, nucleic acid structure, lipid structure, and carbohydrate structure are normally possible to remove from a liquid according to the invention (provided they have, or can be provided with, a negative charge). In principle the invention is applicable also to other biomolecules and organic substances provided they meet the structural demands given above.

The substance may be dissolved in the aqueous medium or be in the form of small bio-particles, for instance of colloidal dimensions. Illustrative examples of bio-particles are viruses, cells (including bacteria and other unicellular organisms) and cell aggregates and parts of cells including cell organelles.

It is believed that the invention in particular will be applicable to aqueous liquids that are derived from biological fluids comprising a substance of interest together with high concentration of salts. The novel anion-exchangers are likely to be extremely useful in desalting, e.g. by enabling adsorption at high ionic strength and desorption at a lowered ionic strength by first changing the pH to reduce the positive charge of the adsorbed substance.

Typical liquids of high ionic strength that contain a target substances of interest are fermentation broths/liquids, for instance from the culturing of cells, and liquids derived therefrom. The cells may originate from a vertebrate, such as a mammal, or an invertebrate (for instance cultured insect cells such as cells from butterflies and/or their larvae), or a microbe (e.g. cultured fungi, bacteria, yeast etc). Included are also plant cells and other kinds of living cells, preferably cultured.

In case aqueous liquid (I) containing the substance to be removed contains particulate matter then it may be beneficial to utilize fluidised particulate support matrices carrying the novel anion-exchange ligands together with an upward flow. Aqueous liquids (I) of this type may originate from (a) a fermentation broth/liquid from the culture of cells, (b) a liquid containing lysed cells, (c) a liquid containing cell and/or tissue homogenates, and (d) pastes obtained from cells.

The Second Aspect of the Invention

This aspect comprises an anion-exchanger (1) comprising a plurality of anion-exchange ligands attached to a hydrophilic base matrix. The ligands plus spacer comply with the formula:

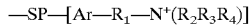

$$—SP—[Ar—R_1—N^+(R_2R_3R_4)]$$

where the symbols have the same meaning as previously.

The characteristic feature is that the anion-exchanger (1) has a maximal breakthrough capacity somewhere in the pH-interval 2–12 for at least one of the reference proteins: ovalbumin, conalbumin, bovine serum albumin, β-lactglobulin,α-lactalbumin, lyzozyme, IgG, soybean trypsin inhibitor (STI) which is ≧200%. such as ≧300% or ≧500 or ≧1000% of the corresponding maximal breakthrough capacity obtained for a Q-exchanger (—CH$_2$CH(OH)CH$_2$N$^+$(CH$_3$)$_3$ (anion-exchanger 2). The same support matrix, degree of substitution, counter-ion etc are essentially the same in the same sense as discussed above. The preferred reference anion-exchangerr is Q Sepharose Fast Flow as discussed above. The running conditions for determining breakthrough capacities of anion-exchanger (1) and anion-exchanger (2) are essentially the same as discussed elsewhere in this text.

Breakthrough capacities are determined under the anion-exchanger conditions defined under the heading "Selection of anion-exchangerr to be used for the removal of a particular substance". The relative breakthrough capacity for each reference substance is in the typical case determined separately by using an aqueous liquid consisting of a buffer and the reference substance for which breakthrough capacity is to be determined.

The various embodiments and their preferences are the same as above. Thus in preferred variants at least one of SP, R'$_1$ and R$_{2-4}$ typically comprises an electron acceptor-donor atom or group, as defined above for the first aspect of the invention, for instance participating in hydrogen-bonding. The electron donor-acceptor group or atom may for instance be present in a branch in the spacer (SP).

The Third Aspect of the Invention

This aspect is a method for testing (screening) the appropriateness of one or more anion-exchangers for removing a substance from a liquid. The method comprises the steps of:

(a) providing a library which comprises
  (i) one or more anion-exchangers to be tested (test anion-exchangerrs, exchangers 1, 2, 3, 4 . . . n; n=an integer >0) each of which anion-exchangers differs with respect to kind of ligand (ligands 1, 2, 3, 4 . . . n), and
  (ii) a reference anion-exchanger having a reference ligand, the support matrix, counter-ion etc being essentially the same in the exchangers 1, 2, 3, 4 . . . n and in the reference anion-exchanger;
(b) determining the maximal breakthrough capacity somewhere in the pH-interval 2–12 of exchanger 1 for the substance at a predetermined condition;
(c) determining the maximal breakthrough capacity in the pH-interval 2–12 of the reference anion-exchanger for the substance at the same condition as in step (b);
(d) concluding with the aid of the relation between the maximal breakthrough capacities obtained in steps (b) and (c), if anion-exchanger (1) is appropriate to use for removing the substance; and
(e) repeating, If necessary, steps (b)–(c) for at least one of the exchangers 2, 3, 4 . . . n.

In case the degree of substitution varies between the reference anion-exchangerr and the individual anion-exchangerrs to be tested this should be accounted for when step (d) is carried out. This in particular applies if the variation in degree of substitution is large for instance with a factor greater than 3, 5 or 10 for anion-exchangers 1, 2 . . . n.

In particular it is believed that in case the maximal breakthrough capacity determined for a test anion-exchanger/ligand is larger than for the reference anion-exchanger/ligand then the test anion-exchanger/ligand will have advantages over the reference anion-exchanger/ligand. This conclusion will be more pronounced in case the maximal breakthrough capacity determined for the test anion-exchanger/ligand is ≧200%, such as ≧300% or ≧500% or ≧1000% of the breakthrough capacity of the reference anion-exchanger/ligand.

This screening method is in particular adapted for screening libraries in which at least one of the anion-exchangers 1-n are as defined
  (a) in the first and second aspects of the present invention,
  (b) in U.S. Pat. No. 6,090,288 (Amersham Pharmacia Biotech AB), and (c) in International Patent Application filed in parallel with this application and based on SE 9904197-2 (A method for anion-exchange adsorption and thioether anion-exchangerrs).

The method also applies to cases where the anion-exchangerrs 1-n also include one or more conventional anion-exchangerrs and anion-exchangerrs in which a positively charged nitrogen is part of an aromatic ring, such as pyridine, pyrrole, imidazole etc.

Two or more of the anion-exchangers 1-n may be tested in the method in parallel or in sequence.

The reference anion-exchanger may have a ligand that is defined in the first and/or second aspects of the invention.

Selection of running conditions and reference anion-exchanger can be done as outlined for the first and second aspects of the invention. Steps (b) and/or (c) may be performed at an ionic strength corresponding to the ionic strength of a water solution that consists of 0.1 M NaCl or more, preferably ≧0.25 M NaCl. Step (b) and (c) may or may not be carried out under anion-exchanger conditions.

In the third aspect of the invention, tabulated or predetermined breakthrough capacities for the reference anion-exchanger may be used. Thus the method also encompasses measurements carried out at different times and/or by different individuals or by machines, including using tabulated values from outside sources for the reference anion-exchanger or the reference anion-exchange ligand.

An anion-exchanger ligand found by this screening method can often be used in an inventive manner in the method of the invention for removal of a substance from a liquid as defined above.

An innovative method for lowering the salt concentration in liquids which contain proteins and the like.

This method is primarily intended for removing salt (desalting) from a liquid (I) containing a negatively charged substance as defined above, preferably amphoterc. Henceforth the term desalting of a liquid will encompass any kind of ionic strength reduction by removing charged substances from the liquid. For the largest advantages to be accomplished the ionic strength of liquid (I) is above the ionic strength of an aqueous solution of 0.1 M NaCl or 0.15 M NaCl or 0.2 M NaCl or 0.5 M NaCl.

The method comprises the steps of:

(i) contacting a liquid (I) with an anion-exchanger (1) that comprises a base matrix carrying a plurality of ligands in which there is a positively charged nitrogen under conditions permitting binding between the anion-exchangerr and the substance, (ii) desorbing said substance from said anion-exchanger by the use of a liquid (liquid (II)).

The method is characterized in:

(A) selecting anion-exchanger (1) among anion-exchangers that are
  (a) capable of binding the substance of interest in an aqueous reference liquid at an ionic strength corresponding to 0.1 M NaCl, preferably 0.25 M NaCl; and
  (b) permitting a maximal breakthrough capacity in the pH interval 2–12 for the substance which is ≧100%, such as ≧125% or ≧200% or ≧300% or ≧500% or ≧1000%, of the breakthrough capacity of the substance for Q-Sepharose Fast Flow (anion-exchanger 2, Amersham Pharmacia Biotech, Uppsala, Sweden), said anion-exchangers (1) and (2) having essentially the same ligand density, and the breakthrough capacities being determined under the essentially same conditions.

B. adjusting the pH of liquid (II) in step (ii) by the use of a buffering acid-base pair to a pH value that means a lower net positive charge or zero charge or a net negative charge (if possible) on the anion-exchanger and/or a lower net negative, zero or net positive charge on the substance thereby, if necessary by combining with a lowered ionic strength and/or a lowered polarity compared to liquid (I) and/or by including a neutral structural analogue.

The anion-exchanging ligand may be a primary, a secondary, a tertiary, a quaternary ammonium group, or an amidinium group. Heteroaromatic groups in which there is a nitrogen atom in the aromatic ring are included in the term tertiary ammonium groups. In the same fashion, N-alkylated forms of such heteroaromatic groups are included in quaternary ammonium groups. The pKa of the ligands are found in the interval from 4 and upwards.

The anion-exchangerrs and the ligands to be used may be of the mixed mode kind as described
(a) herein or
(b) in International Patent Application filed in parallel with this application and based on SE 9904197-2 (A method for anion-exchange adsorption and thioether anion-exchangerrs), or
(c) in U.S. Pat. No. 6,090,288 (Amersham Pharmacia Biotech AB).

U.S. Pat. No. 6,090,288 corresponds to WO-A-9729825 (Amersham Pharmacia Biotech) and is together with the patent application under item (b) hereby incorporated by reference. U.S. Pat. No. 6,090,288 discloses mixed mode anion-exchangers having enhanced binding to substances based on charge interaction and hydrogen-bonding involving oxygen and amino nitrogen on 2–3 carbons' distance from positively charged amine nitrogen. The anion-exchangerrs under item (b) have ligands in which there is a thioether function in the proximity of a positively charged atom as also defined for the instant invention.

Step (ii) as defined above means that the elution (step (ii)) will require a significantly lowered ionic strength compared to the ionic strength of liquid (I) in step (i). The substance can thus be eluted in concentrated form in a solution of low concentration of salt, e.g ≦100 mM or even ≦10 mM. Typically the appropriate pH in step (ii) shall be below pI+2 or below pI+1, with preference for pH≦5 pI, of the desired substance to be desorbed. Depending on the particular ligands involved, it may also be preferred to adjust pH≦pKa of the ligands/anion-exchangers used.

pH may be adjusted between steps (i) and (ii) by the use of a buffering acid-base pair In which the acid and/or the base is volatile and/or uncharged. This will mean that the buffer components can be removed simply by evaporation after step (ii). Volatile buffer components typically have a vapour pressure that is ≧1 mm Hg, such as ≧10 mm Hg, at 25° C. General rules regarding selection of buffer components are given above.

Elution by changing the pH may be supported by including an organic water-miscible solvent in liquid (II), preferably a volatile solvent with a vapour pressure ≧10 mm Hg, such as ≧10 mm Hg, at 25° C. Structural analogues should be neutral and preferably volatile as defined for a solvent By the term salt in this context is meant a compound that, when dissolved in either liquid (I) or liquid (II), forms positively charged moieties and negatively charged moieties. Each negatively charged moiety carries a low number of negative charges per molecule, for instance one, two or three, and is preferably non-polymeric The positively charged moiety doesn't have any such restrictions. If the principle of this aspect is applied to desalting with cation exchangers the demands on the cation in the salt will correspond to those for the anion when anion-exchangerrs are used.

This innovative aspect is particularly useful for liquids containing the above-mentioned substances which cannot be desalted by existing methods, such as membrane filtration, dialysis, gel filtration etc, or for liquids that are handled in processes requiring low salt concentration or absence of salt, for instance affinity adsorption, mass spectrometry, etc. Thus it will be advantageous to desalting according to the invention a solution containing a desired substance before some kind of analyses, is made on the substance as such.

This aspect of the invention also embraces the analogous aspect in which a cation exchanger is used. The cation exchanger may be as defined in SE 0002688-0 filed Jul. 17, 2000 (Adsorption method and ligands), WO 996507 (Amersham Pharmacia Biotech AB) etc.

The invention will now be illustrated with patent examples. The invention is further defined in the appending claims.

EXPERIMENTAL PART

Part I: Synthesis of Anion-Exchangerrs

General

Volumes of matrix refer to sedimented bed volume. Weights of matrix given in gram refer to the suction dried weight It is understood that these matrices are still water solvated material. For reactions on a large scale, stirring refers to the use of a suspended, motor-driven stirrer since the use of a magnet bar stirrer will to damage the beads. Small-scale reactions (up to 20 ml) were performed in dosed vials on a shaking-table. Determination of the functionality and the extent of allylation, epoxidation, or the degree of substitution of ion exchanger groups on the beads were made using conventional methods. Elementary analyses of the gels were also performed especially for analysing of the sulphur content A typical example for preparing the anion-exchangerrs described above is exemplified below using Sepharose 6 Fast Flow (Amersham Pharmacia Biotech, Uppsala, Sweden) as the base matrix.

1. Introduction of Allyl Groups on the Matrix:

In a typical procedure allylation was carried out using allyl glycidyl ether, but note that the introduction of allyl groups on the solid support can as well be easily achieved with using allyl bromide. 80 g of Sepharose 6 Fast Flow was mixed with 0.5 g of $NaBH_4$, 13 g of $Na_2SO_4$ and 40 ml of 50% aqueous solution of NaOH. The mixture was stirred for 1 hour at 50° C. After addition of 100 ml of allylglycidyl ether the temperature of the suspension was maintained at 50° C. and stirred for 18 hours. The mixture was filtered and the gel washed successively with 500 ml distilled water, 500 ml ethanol, 200 ml distilled water, 200 ml 0.2 M acetic acid and 500 ml distilled water.

Titration gave a degree of substitution of 0.3 mmol of allyl/ml of settled gel. It was possible to obtain a degree of substitution of 0.45 mmol of allyl/ml gel by starting from a gel that had been drained (100 ml gel to 75 ml gel).

2. Introduction of Amines Groups on the Matrix:

In a typical procedure the amines groups were introduced on the matrix directly via the nitrogen atom of the amine groups or via the sulphur atom in thiol containing derivatives. Derivatives containing other reactive nucleophilic groups such as phenol for example can as well be used. Coupling to the matrix was realised in preference via bromination of the allyl group and nucleophilic substitution under basic conditions. In some cases and for thiol-containing derivatives radical addition to the allyl was as well performed. In the case where the attachment point to the gel was achieved via other nucleophilic groups than the amine, the amine group can be introduced as a protected form and a deprotection step is then necessary.

Amine groups can also be introduced by other conventional methods, for example reductive amination.

2.1. Activation of allyl Sepharose via Bromination:

Bromine was added to a stirred suspension of 100 ml of allyl activated Sepharose 6 Fast Flow (0.4 mmol allyl groups/ml drained gel), followed by 4 g of AcONa and 100 ml of distilled water, until a persistent yellow colour was obtained. Sodium formiate was then added till the suspension was fully decolourised. The reaction mixture was filtered and the gel washed with 500 ml of distilled water. A suitable aliquot of the activated gel was then transferred to a reaction vessel and coupled with the appropriate ligand according to the following procedures.

2.1.a. Couplinq of Octopamine to Sepharose 6 Fast Flow.

5.5 g of bromine activated gel (0.4 mmol allyl groups/ml drained gel) were transferred to a reaction vessel containing a solution of octopamine (2 g) in water (4 ml) that has been adjusted to pH 11.5 by addition of a 50% aqueous solution of NaOH. The mixture was stirred for 17 hours at 50° C. The suspension was filtered and the gel was washed successively with 3×10 ml of distilled water, 3×10 ml EtOH. 3×10 ml aqueous 0.5 M HCl and finally 3×10 ml of distilled water. The degree of substitution was 0.10 mmol amine group/ml of gel.

2.1.b. Coupling of 2-Amino4-(trifluoromethyl)-benzenethiol to Sepharose 6 Fast Flow.

6 g of bromine activated gel (0.4 mmol allyl groups/ml drained gel) were transferred to a reaction vessel containing a solution of 2-Amino-4-(trifluoro methyl)-benzenethiol (2.5 9) in water/DMF (2:1, 4 ml) that has been adjusted to pH 11.5 by addition of a 50% aqueous solution of NaOH. The reaction was stirred for 18 hours at 60° C. The suspension was filtered and the gel was successively washed with 3×10 ml of distilled water, 3×10 ml EtOH, 3×10 ml aqueous 0.5 M HCl and finally with 3×10 ml. The degree of substitution was 0.07 mmol amine group/ml of gel.

2.1.c. Coupling of 2-(Boc-amino) Ethanethiol to Sepharose 6 Fast Flow.

A 30 g quantity of bromine activated gel (0.4 mmol allyl groups/ml drained gel) was transferred to a reaction vessel containing a solution of 24Boc-amino) ethanethiol-1 (7.35 g) in water/DMSO (1:3, 40 ml). The pH was adjusted to pH 11 with 1 M NaOH. The reaction was stirred for 16 hours at 50° C. After filtration of the reaction mixture the gel was successively washed with 3×50 ml of distilled water, 3×50 ml DMSO, 3×50 ml of distilled water and finally with 3×50 ml of EtOH.

2.1.d. Coupling of Cysteamine to Amino Ethanethiol Derived Sepharose 6 Fast Flow.

The Boc protected amino ethanethiol gel (6 ml) (from 2.1.c) was treated with a 10% solution of trifluoroacetic acid in $CH_2Cl_2$ (60 ml) for 2 hours at room temperature. The suspension was filtered and the gel was washed successively with 3×10 ml $CH_2Cl_2$, 3×10 ml EtOH, and 3×10 ml of distilled water. The degree of substitution was 0.29 mmol amine group/ml of gel.

2.2. Direct Coupling to the Allyl Group.

2.2.a. Cysteamine Derived Sepharose 6 Fast Flow.

A solution of cysteamine (4.7 g) in MeOH (15 ml) was added to a slurry of 10 ml of allyl activated Sepharose 6 Fast Flow (0.4 mmol allyl groups/ml drained gel) in MEOH (40 ml). The reaction mixture was left under UV irradiation and stirring at 40° C. for 16 hours. The reaction mixture was filtered and the gel was successively washed with 3×10 ml MeOH, 3×10 ml distilled water, 3×10 ml 0.5 M HCl and finally 3×10 ml of distilled water. The degree of substitution was 0.34 mmol amine group/ml of gel.

3. Coupling to Cysteamine Sepharose 6 Fast Flow:

3.1. Boc-L-Phenylalanine Derived Cysteamine Sepharose.

A solution of Boc-L-Phenylalanine N-hydroxysuccinimide ester (0.44 g, 1.2 mmol) in DMF (2 ml) was added to a mixture of cysteamine Sepharose (4 ml, 0.2 mmol amine group/ml gel) and N,N-diisopropylethylamine (1 mmol) in DMF (5 ml). The reaction was allowed to continue for 18 hours at room temperature. The reaction mixture was filtered and the gel was washed successively with 3×10 ml DMF, 3×10 ml acetone, and finally 3×10 ml of distilled water. Residual amine groups were calculated to be 0.033 mmol amine group/ml of gel after titration.

3.2. L-Phenylalanine derived cysteamine Sepharose.

The Boc protected L-phenylalanine derived cysteamine gel (3 ml) (from 3.1 or 2.1.d) was treated with a 10% solution of trifluoroacetic acid in $CH_2Cl_2$ (4 ml) for 2 hours at room temperature. The reaction mixture was filtered and the gel was washed successively with 3×10 ml $CH_2Cl_2$, 3×10 ml acetone, and 3×10 ml of distilled water. The degree of substitution of the product was 0.19 mmol amine group/ml of gel.

3.3. Fmoc-L-Tyrosine Derived Cysteamine Sepharose.

A solution of Fmoc-L-tyrosine N-hydroxysuccinimide ester (1.1 mmol) in DMF (3 ml) was added to a slurry of cysteamine Sepharose (3.3 ml. 0.3 mmol amine group/ml gel) in DMF (5 ml). The mixture was stirred for 18 hours at room temperature. The suspension was filtered and the gel was washed with 3×10 ml DMF.

3.4. L-Tyrosine Derived Cysteamine Sepharose:

The Fmoc protected L-tyrosine derived cysteamine gel (3.3 ml) (from 3.3) was treated with a 10% solution of 1,8diazabicylo[5,4,0]-undec-7-ene in DMF (10 ml) for 18 hours at room temperature. The reaction mixture was filtered and the gel was washed successively with 3×10 ml DMF, 3×10 ml acetone, and 3×10 ml of distilled water. The degree of substitution was 0,28 mmol amine group/ml of gel.

Part II. Chromatography

To verify that the ligands suggested in this invention adsorb proteins at higher ionic strengths than the reference anion-exchanger, breakthrough capacities of bovine serum albumin (BSA) was determined. The new "high-salt" anion-exchange ligands attached to Sepharose Fast Flow were compared to Q Sepharose Fast Flow in this study. Furthermore, the elution conductivity of three proteins, namely conalbumin (Con A), lactalbumin (Lactalb) and soybean trypsin inhibitor (STI), was also determined for all anion-exchangers. This function test was used to verify retardation at high salt conditions for other proteins as well. Four of the "high-salt" anion-exchanger ligands with high breakthrough capacities were also tested with respect of recovery of the protein (BSA) applied.

A. Breakthrough Capacity (Qb10%) at High Salt Condition

The Qb10%-value was evaluated at relatively high concentration of salt (025 M NaCl) relative to the reference anion-exchanger Q Sepharose Fast Flow that was operated under identical conditions. The Qb10%-values for the different anion-exchangers were determined using the method of frontal analysis described below.

EXPERIMENTAL

I. Buffer and Sample Solutions

The sample solution was BSA dissolved in 20 mM piperazin (pH=6.0) with 0.25 M NaCl added. The concentration of BSA was 4 mg/ml. Buffer and sample solutions were filtered through 0.45 μm Millipore Millex HA filters before use.

II. Chromatographic System

All experiments were performed at room temperature using Akta Explorer 100 chromatography system (Amersham Pharmacia Biotech AB, Uppsala. Sweden) equipped with Unicom 3.1 software. Samples were applied to the column via a 150 ml superloop. A flow rate of 1 ml/min (ca 300 cm/h) was used throughout The effluents were monitored continuously by absorbance measurements at 280 nm using a 10 mm flow cell.

III. Frontal Analysis

Each prototype anion-exchanger was packed in a HR 5/5 column (packed bed volume=1) and equilibrated with the piperazine buffer (20 mM piperazin, pH=6.0, with 0.25 M NaCl). The breakthrough capacity ($Q_b$) was evaluated at 10% of the maximum W detector signal (280 nm). The maximum UV signal was estimated by pumping the test solution directly into the UV detector. The breakthrough capacity was calculated from the retention volume at 10% height of the maximum signal after correction of the dead volume.

A column equilibrated with the piperazine buffer was continuously fed (via a 150 ml superloop) with the sample solution at a flow rate of 1 ml/min (i.e. ca. 300 cm/h). The application of sample was continued until the $A_{280}$ of the effluent reached a level of 10% of A280 of the sample solution. On the basis of data so obtained (i.e. volume of the packed gel bed ($V_c$), its void volume, flow rate and concentration of BSA to the column), the breakthrough capacity of the gel (Qb10%) can be calculated. The results obtained have formed the basis for screening a large number of "high salt ligand" candidates and the results will be presented below.

IV. Evaluation

The breakthrough capacity at a level of 10% of absorbance maximum of the BSA sample solution (QbBSA) was calculated with the formula:

$$QbBSA=(T_{R10\%}-T_{RD})\times C/Vc$$

where:

$T_{R10\%}$=retention time at 10% of absorbance maximum (min)

$T_{RD}$=Dead time in the system (min)

C=Concentration of BSA (4 mg/mL)

$V_c$=Column volume (mL)

B. Function Test

The anion-exchange media were packed in 1.0 ml HR 5/5 columns and equilibrated with 20 column volumes of the A-buffer (20 mM phosphate buffer; pH 6.8). 50 μl of a protein mixture (6 mg/ml Con A, 4 mg/ml Lactalbumin and 6 mg/ml STI) were applied to the column and eluted with a linear gradient (gradient volume=20 column volumes) to 100% of the B-buffer (A-buffer plus 2.0 M NaCl). The flow rate was adjusted to 0.3 ml/min (100 cm/h). All experiments were performed at room temperature using Akta Explorer 100 chromatography system equipped with Unicorn 3.1 software.

C. Recovery of BSA Bound to "High Salt" Anion-exchanger Ligands

Details concerning type of column, packed bed volume, buffers, protein solution, flow rate and type of apparatus are outlined above. To a column equilibrated with piperazine buffer (20 mM piperazine, pH=6.0, with 0.25 M NaCl) was applied a solution of BSA from a 50 ml super loop until an amount corresponding to 30% of its breakthrough capacity was applied. The column was then washed with 2 bed volumes of the equilibrium buffer and the bound BSA was eluted with the appropriate de-sorption buffer. In case of ligands (Tyrosine) and (2-Aminobenzimidazole) adsorbed BSA were eluted with a piperazine buffer (20 mM piperazine, pH=6.0, with 2.0 M NaCl). In addition, adsorbed BSA on ligands (Octopamine) and (Tyrosinol) were eluted with a TRIS buffer (0.2 M TRISS, pH=9.0, with 2 M NaCl).

Results

The results obtained for breakthrough capacities for a series of representative "high salt" anion-exchanger ligands are summarised in Table 1 and the structures of the ligands are depicted in section part III. The degree of ligand substitution on the majority of these new anion-exchangers was ca. 0.05–0.3 mmol/ml packed gel. As a reference anion-exchanger, the commercially available Q Sepharose Fast Flow was used. The ligand density is in the same range as the new series of anion-exchangers. The results indicate the following trends.

1. The new anion-exchange ligands have much higher elution conducively for all three proteins compared to the reference anion-exchangerr Q Sepharose Fast Flow (Table 1).
2. The new anion-exchange ligands have also a much higher breakthrough capacity for BSA (QbBSA) compared to Q Sepharose Fast Flow. The ligand that gave the highest Qb-value corresponds to an increase of 4300% relative the reference anion-exchanger. Of the presented ligands (Table 1), the one that gave the lowest Qb-value corresponds to a 500% increase compared to Q Sepharose Fast Flow.
3. All good anion-exchange ligands are primary or secondary amines or both primary and secondary amines. No good ligand based on a quaternary amine has been found.
4. The recovery data from good anion-exchange ligands (7, 5, 27 and 4) show that adsorbed BSA can be eluted by a salt step (7 and 5) and/or a combined pH and salt step (2 and 4) with recoveries larger than 80% (see Part III).

TABLE 1

Elution conductivity at pH 6 for three proteins and breakthrough capacity of BSA (pH 6 and 0.25M NaCl) on different anion-exchangers.

| Ligand | Ligand density mmol/ml | Breakthrough Capacity QbBSA (mg/ml) | ConA (mS/cm) | Lactal bumine (mS/cm) | STI (mS/cm) |
|---|---|---|---|---|---|
| Q Sepharose Fast Flow | 0.21 | 1 | 12 | 20 | 30 |
| 1. Thiomicamine | 0.13 | 43 | ne | ne | ne |
| 2. Tyrosinol | 0.13 | 39 | 132 | ne | ne |
| 3. Tryptophanol | 0.15 | 37 | ne | ne | ne |
| 4. Octopamine | 0.10 | 37 | ne | ne | ne |

TABLE 1-continued

Elution conductivity at pH 6 for three proteins and breakthrough capacity of BSA (pH 6 and 0.25M NaCl) on different anion-exchangers.

| Ligand | Ligand density mmol/ml | Breakthrough Capacity QbBSA (mg/ml) | ConA (mS/cm) | Lactal bumine (mS/cm) | STI (mS/cm) |
|---|---|---|---|---|---|
| 5. 2-Aminobenzimidazole | 0.17 | 34 | 46 | 117 | ne |
| 6. Phenylalanine/cysteamine | 0.20 | 33 | ne | ne | ne |
| 7. Tyrosine | 0.30 | 31 | 45 | 68 | 121 |
| 8. 2-Amino-3-phenylpropanol | 0.17 | 31 | ne | ne | ne |
| 9. α-(1-amino ethyl-4-hydroxy benzyl alcohol | 0.09 | 29 | 79 | 88 | ne |
| 10. 2-Amino-4-nitrophenol | na | 27 | ne | ne | ne |
| 11. 2-(4-aminophenyl) ethyl amine | 0.20 | 26 | 99 | ne | ne |
| 12. Noradrenaline | 0.08 | 25 | ne | ne | ne |
| 13. Benzylcysteine/cysteamine | na | 25 | ne | ne | ne |
| 14. 2-Amino-1-(4-nitrophenyl)-1,3-propanediol | 0.09 | 23 | ne | ne | ne |
| 15. 2-Amino-1-phenyl-1.3-propanediol | 0.09 | 22 | 24 | 81 | ne |
| 16. 2-Amino-4-(trifluoromethyl)-benzenethiol | 0.01 | 21 | ne | ne | ne |
| 17. 3,4-Dihydroxy benzylamine | 0.11 | 18 | 46 | 65 | 110 |
| 18. p-Aminobenzamidine | 0.10 | 17 | 43 | 62 | ne |
| 19. Boc-His(Boc)-Osu | 0.30 | 17 | 21 | 39 | 78 |
| 20. 4,6-Diamino-2-mercapto pyrimidine | 0.10 | 14 | ne | ne | ne |
| 21. Treophenylserine/cysteamine | na | 14 | 29 | 54 | 78 |
| 22. Tyrosinol | 0.07 | 13 | ne | ne | ne |
| 23. 4-Aminothio phenol | 0.05 | 13 | ne | ne | ne |
| 24. Thienylserine/cysteamine | na | 12 | 27 | 50 | 72 |
| 25. 1,2,4,5-Tetra aminobenzene | 0.10 | 9 | 71 | ne | ne |
| 26. 4-Amino-1,3,5-triazine-2-thiol | 0.07 | 9 | na | na | na |
| 27. Sulfanilamide | 0.05 | 8 | ne | 63 | ne |
| 28. 4-Aminophenol | 0.05 | 5 | ne | 40 | ne | ne = not eluted, na = not analysed

Part III. Ligands and Recovery.

The best ligands tested was derived from the following compounds:

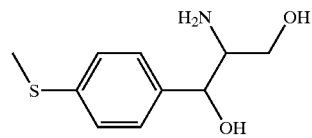

1. Thiomicamine: Ar=4-methylthioxyphenyl, R'$_1$=—CH(OH)CH(CH$_2$OH)—, n=0, m=1, SP ends with —CH$_2$CH(OH)CH$_2$O— (coupling at the amino group).

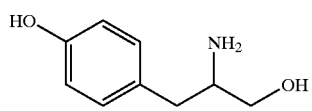

2. Tyrosinol: Ar=4-hydroxyphenyl, n=0, m=1, R'$_1$=—CH$_2$CH(CH$_2$OH)—, SP ends with —CH$_2$CH(OH)CH$_2$O— (coupling at the amino group) Recovery 80%

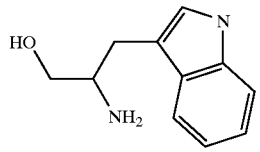

3. Tryptophanol: Ar=3indolyl, n=0, m=1, R'$_1$=—CH$_2$CH(CH$_2$OH)—, SP ends with —CH$_2$CH(OH)CH$_2$O— (coupling at the amino group).

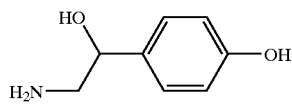

4. Octopamine: Ar=4-hydroxyphenyl, n=0, m=1, R'$_1$=—CH(OH)CH$_2$—, SP ends with —CH$_2$CH(OH)CH$_2$O— (coupling at the amino group). Recovery 80%

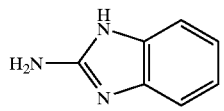

5. 2-aminobenzimidazole: Ar=2-benzimidazolyl, m=0. SP ends with —CH$_2$CH(OH)—CH$_2$O— (coupling at the amino group). Recovery 82%

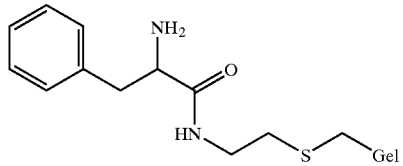

6. Phenylalanine/cysteamine: Ar=phenyl, n=0, m=1, R'$_1$=—CH$_2$CH<, SP ends with —CONHCH$_2$CH$_2$SCH$_2$—

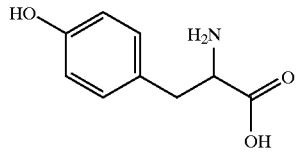

7. Tyrosine: Ar=4-hydroxyphenyl, n=0, m=1, R'$_1$=—CH$_2$CH<, SP ends with —CONHCH$_2$— (coupling at the carboxy group). Recovery=98%

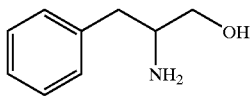

8. 2-Amino-3-phenylpropanol: Ar=phenyl, n=0, m=1, R'$_1$=—CH$_2$CH(CH$_2$OH)—, SP ends with —CH$_2$CH(OH)CH$_2$O— (coupling at the amino group).

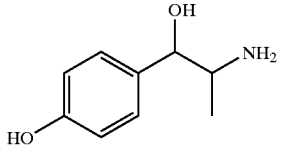

9. Alpha-(1-aminoethyl)-4-hydroxbenzyl alcohol: Ar=4-hydroxyphenyl, n=0, m=1, R'$_1$=—CH(OH)CH(CH$_3$)—, SP ends with —CH$_2$CH(OH)CH$_2$O— (coupling at the amino group).

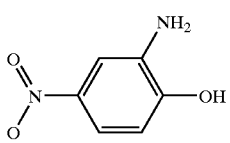

10. 2-Amino-4-nitrophenol: Ar=2-hydroxy-5-nitrophenyl, m=0, SP ends with —CH$_2$CH(OH)CH$_2$O— (coupling at the amino group).

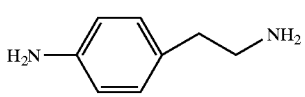

11. 2-(4-aminophenyl) ethylamine:
Ar=4-(2-aminoethyl)phenyl, m=0, SP ends with —CH$_2$CH(OH)CH$_2$O— (coupling at aromatic amino group).
Ar=4-aminophenyl, n=0, m=1, R'$_1$=—CH$_2$CH$_2$—, SP ends with —CH$_2$CH(OH)CH$_2$O— (coupling at aliphatic amino group)

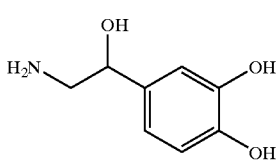

12. Noradrenaline: Ar=3,4-dihydroxyphenyl, n=0, m=1, R'$_1$=—CH(OH)CH$_2$—, SP ends with —CH$_2$CH(OH)CH$_2$O—(coupling at the amino group).

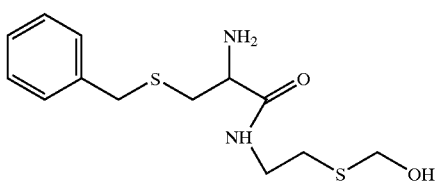

13. Benzylcysteine/cysteamine: Ar=phenyl, n=0, m=1, R'$_1$=—CH$_2$CH$_2$S CH$_2$CH<, SP ends with —CONHCH$_2$CH$_2$SCH$_2$—

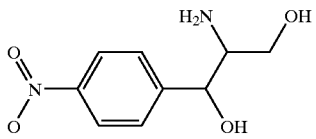

14. 2-Amino-1(4-nitrophenyl)1,3-propanediol: Ar=4-notrophenyl, n=0, m=1, R'$_1$=—CH(OH)CH(CH$_2$OH)—, SP ends with —CH$_2$CH(OH)CH$_2$O— (coupling at the amino group).

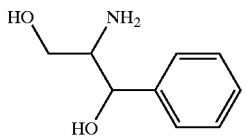

15. 2-Amino-1-phenyl-1,3-propanediol: Ar=phenyl, n=0, m=1, R'$_1$=—CH$_2$CH(CH$_2$OH)—, SP attaches at amino and ends with —CH$_2$CH(OH)CH$_2$ (coupling at the amino group).

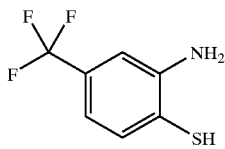

16. 2-Amino-4-(trifluoromethyl)-benzenethiol: Ar=5-trifluoromethylphen-1,2-diyl, m=0, R'$_1$=—CH$_2$CH(CH$_2$OH)—, SP attaches at Ar and ends with —SCH$_2$— (coupling at the mercapto group)

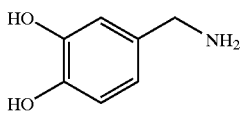

17. 3,4-Dihydroxybenzylamine: Ar=3,4-dihydroxyphenyl, n=0, m=1, R'$_1$=—CH$_2$—, SP attaches at amino and ends with —CH$_2$CH(OH)CH$_2$O— (coupling at the amino group).

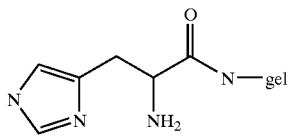

19. Boc-HIS(Boc)-Osu: Ar=4-imidazolyl, n=0, m=1, R'$_1$=—CH$_2$CH<, SP ends with —CONHCH$_2$CH—.

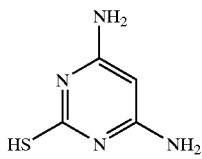

20. 4,6-diamino-2-mercaptopyrimidine: Ar=4-aminopyrimid-2,6-yl or 6-aminopyrimid-2,4-diyl, m=0, SP attaches at Ar and ends with —SCH$_2$— (coupling at the mercapto group).

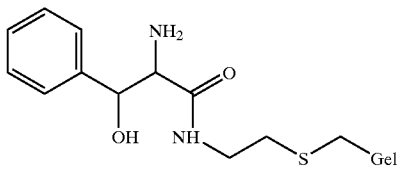

21. Treophenylserine/cysteamine: Ar=phenyl, n=0, m=1, R'$_1$=—CH(OH)CH<, SP attaches at R'$_1$ and ends with —CONHCH$_2$CH$_2$SCH$_2$—. QbBSA=14 mg/ml

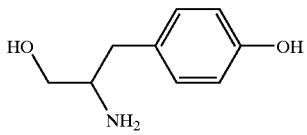

22. Tyrosinol: Ar=4-hydroxyphenyl, n=0, m=1, R'$_1$=—CH$_2$CH(CH$_2$OH)—, SP attaches at amino and ends with —CH$_2$CH(OH)CH$_2$O— (coupling at the amino group).

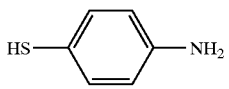

23. 4-aminothiophenol: Ar=phenyl, m=0, SP attaches at Ar and ends with —SCH$_2$— (coupling at the amino group).

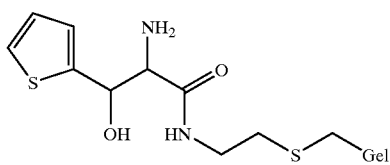

24. Thienylserine/cysteamine: Ar=2-thienyl, n=0, m=1, R'$_1$=—CH(OH)CH<, SP attaches at R'$_1$ and ends with —CONHCH$_2$CH$_2$SCH$_2$—.

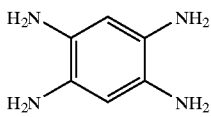

25. 1,2,4,5-tetraaminobenzene: Ar=2,4,5-triaminophen-1-yl, m=0, SP attaches at aryl and ends with —NHCH$_2$CH(OH)CH$_2$— (coupling at an amino group).

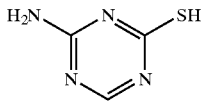

26. 4-amino-1,3,5-triazine-2-thiol: Ar=1,3,5triazin-2,6-diyl, m=0, SP attaches at Ar and ends with —SCH$_2$— (coupling at the mercapto group).

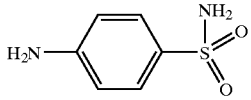

27. Sulfanilamide: Ar=4-sulphonamidophenyl, m=0, SP attaches at amino and ends with —NHCH$_2$CH(OH)CH$_2$— (coupling at the amino group)

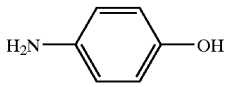

28. 4-aminophenol: Ar=4-hydroxphenyl, m=0, SP attaches at amino and ends with —NHCH$_2$CH(OH)CH$_2$— (coupling at the amino group). Ligand density: low

What is claimed is:

1. A method for the removal of a substance carrying a negative charge and being present in an aqueous liquid (I), said method comprising the steps of (i) contacting the liquid with a matrix carrying a plurality of ligands comprising a positively charged structure (anion-exchanger) and a hydrophobic structure under conditions permitting binding between the ligands and the substance, and (ii) desorbing said substance from said matrix, wherein (I) each of said ligands has the formula:

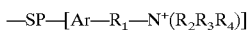

wherein (A) [Ar—R$_1$—N$^+$(R$_2$R$_3$R$_4$)] represents a ligand in which
  a) Ar is an aromatic ring,
  b) R$_1$ is [(L)$_n$R'$_1$]$_m$ wherein
    n and m are integers selected amongst zero or 1;
    L is an amino nitrogen, an ether oxygen or a thioether sulphur;
    R'$_1$ is a bivalent linker group selected among
    1) linear, branched or cyclic hydrocarbon groups;
    2) —C(=NH)—;
  c) R$_{2-4}$ are selected among hydrogen and lower alkyls;

(B) SP is a spacer providing a carbon, a nitrogen, a sulphur or an oxygen directly attached to Ar—R$_1$—N$^+$(R$_2$R$_3$R$_4$);

(C) represents that the spacer is replacing a hydrogen in (Ar—R$_1$—N$^+$(R$_2$R$_3$R$_4$);

(D) represents binding to the matrix;

(II) the anion exchanger (1) is capable of
  (a) binding to the substance in an aqueous reference liquid (II) under anion-exchange condition at an ionic strength corresponding to 0.3 M NaCl and,
  (b) permitting a maximal break through capacity in the pH interval 2–12 for the substance of at least 200% of the maximal break through capacity in the pH-interval 2–12 of the substance for an exchanger having (—CH$_2$CHOHCH$_2$N$^+$(CH$_3$)$_3$) groups, said anion-exchangers having essentially the same ligand density and break through capacities being determined under the same conditions; and (III) desorption in step (ii) is carried out under anion-exchange conditions when the substance is a serine protease and in particularly when R'$_1$=—C(NH)—.

2. The method of claim 1, wherein m=1 and R'$_1$ is a bivalent linker group selected from the group consisting of linear, branched, and cyclic hydrocarbon groups that may be substituted and/or have a carbon chan that is interrupted by ether oxygen, thioether sulphur or amino nitrogen.

3. The method of claim 1, wherein the matrix has a pKa≦12.

4. The method of claim 1, wherein at least one of Ar, SP, R'$_1$ and R$_{2-4}$, contains one or more electron acceptor-donor atoms or groups at a distance of 1–7 atoms from the positive nitrogen in —N$^+$(R$_2$R$_3$R$_4$) and with the proviso that the Ar atoms or groups are not sp$^2$-carbons in an aromatic structure.

5. The method of claim 4, wherein said acceptor-donor atoms or groups participate in hydrogen-bonding.

6. The method of claim 4, wherein acceptor groups are selected from the group consisting of electron-deficient atoms and electronegative atoms.

7. The method of claim 4, wherein at least one of said one or more hydrogen-bonding atoms is present as a branch group in SP or as a part of the chain in SP extending from the base matrix to the ligand.

8. The method of claim 1, wherein SP contains
  (a) a carbon atom with preference for a carbonyl carbon or an sp$^3$-hybridised carbon; or
  (b) a nitrogen atom with preference for an amino or an amino nitrogen; or
  (c) a sulphur atoms with preference for a thioether sulphur atom; or
  (d) an oxygen, with preference for an ether oxygen atom; which is directly attached to the ligand Ar—R$_1$—N$^+$(R$_2$R$_3$R$_4$), with the proviso that items (b)–(d) only apply when the spacer binds to Ar or R$_1$.

9. The method of claim 1, wherein n=0, m=1, R'$_1$=—C(=NH)—, R$_{2-4}$=hydrogen, Ar=p—C$_6$H$_4$—, SP is attached to Ar via a secondary amino nitrogen.

10. The method of claim 1, wherein the ionic strength during the adsorption/binding step (i) is larger or equal with the ionic strength of 0.25 M NaCl water solution.

11. The method of claim 1, wherein the pH of aqueous liquid (I) is ≦pKa+2, wherein pKa is of the anion-exchanger or of an anion-exchanger.

12. The method of claim 1, wherein the desorbing step includes adding an aqueous liquid (II).

13. The method of claim 12, wherein the aqueous liquid (II) has a pH which is different from the pH of aqueous (I) in order to decrease the negative charge of the substance.

14. The method of claim 12, wherein the polarity of the aqueous liquid (II) is lower than the polarity of the aqueous liquid (I).

15. The method of claim 12, wherein a structural analogue of Ar—R$_1$—N$^+$(R$_2$R$_3$R$_4$) is present in the aqueous liquid (II) in a larger concentration than in the aqueous liquid (I).

16. The method of claim 1, wherein the matrix contains primary or secondary nitrogens.

* * * * *